(No Model.) 2 Sheets—Sheet 1.
W. W. DUNN.
COFFEE ROASTER.
No. 266,790. Patented Oct. 31, 1882.
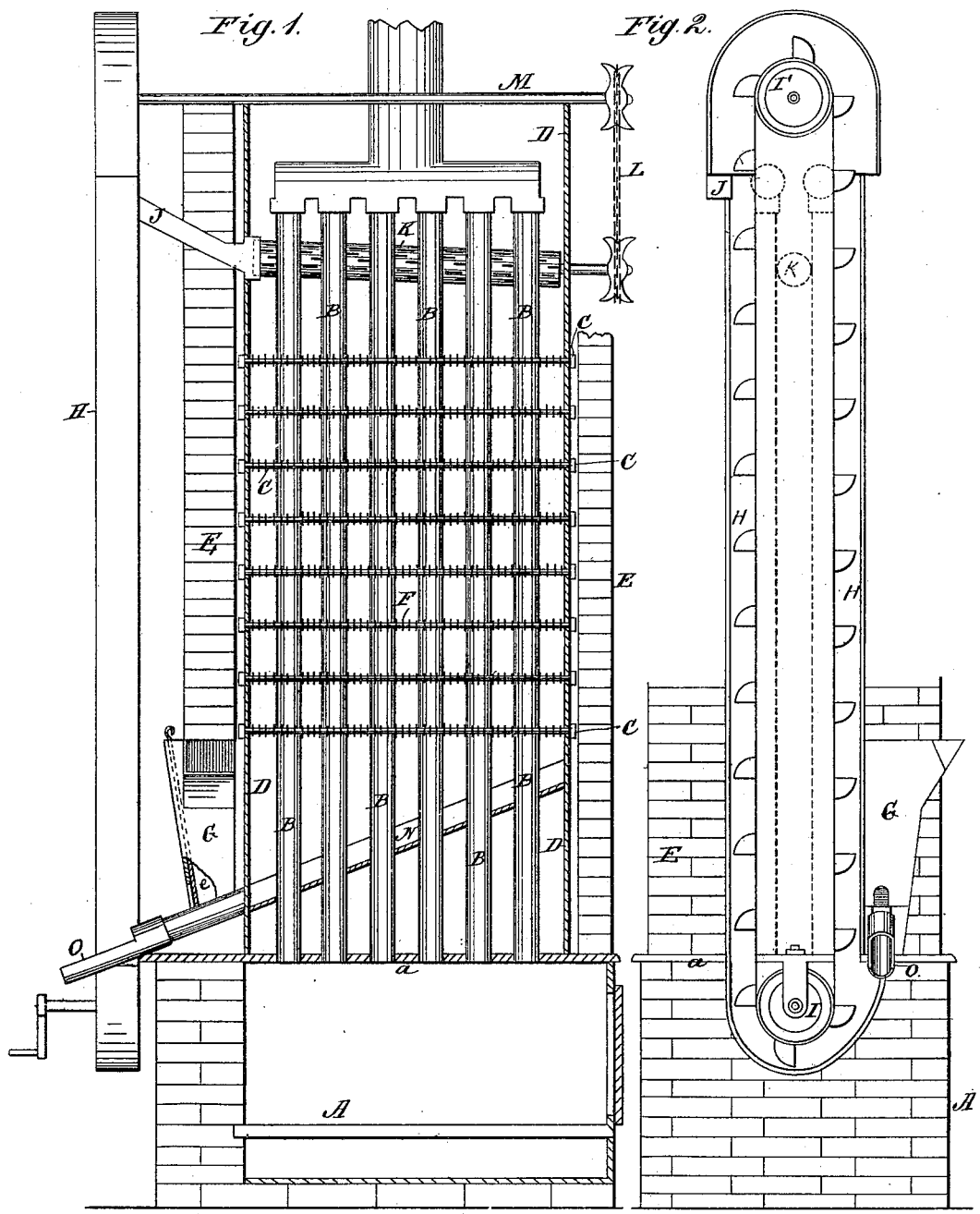
WITNESSES:
W. W. Hollingsworth
Golon C. Kernon
INVENTOR:
W. W. Dunn
BY Dunn & Co
ATTORNEYS.

(No Model.) 2 Sheets—Sheet 2.

W. W. DUNN.
COFFEE ROASTER.

No. 266,790. Patented Oct. 31, 1882.

WITNESSES:
W. W. Hollingsworth
John C. Kennon

INVENTOR:
W. W. Dunn
BY
ATTORNEYS.

N. PETERS, Photo-Lithographer, Washington, D. C.

UNITED STATES PATENT OFFICE.

WILLIAM W. DUNN, OF FORT WORTH, TEXAS.

COFFEE-ROASTER.

SPECIFICATION forming part of Letters Patent No. 266,790, dated October 31, 1882.

Application filed March 24, 1882. (No model.)

*To all whom it may concern:*

Be it known that I, WILLIAM W. DUNN, of Fort Worth, in the county of Tarrant and State of Texas, have invented a new and Improved Coffee-Roaster; and I do hereby declare that the following is a full, clear, and exact description of the same.

The object of my invention is to provide an improved apparatus by which green coffee may be evenly, quickly, and economically parched or roasted to the required degree without burning, thereby producing an article of superior flavor.

The construction and combination of parts are as hereinafter described, reference being had to accompanying drawings, in which—

Figure 3:
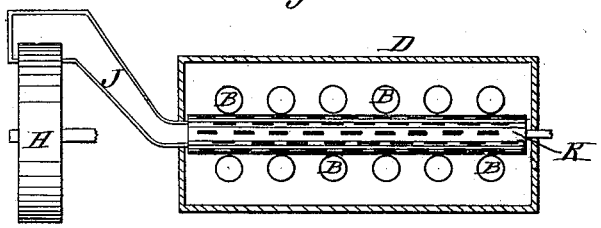
Figure 4:
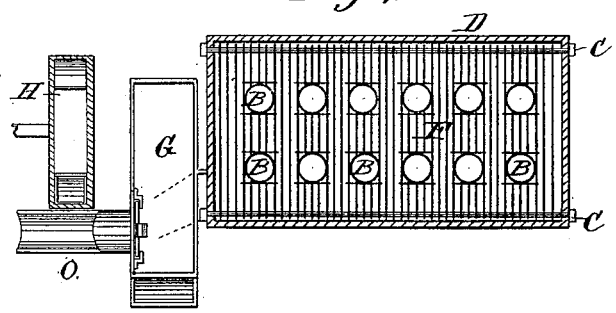
Figure 5:
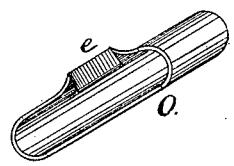
Figure 6:
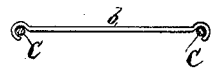

Figure 1 is a sectional elevation of my improved coffee-roaster. Fig. 2 is an end elevation, a portion of the brick casing being omitted. Fig. 3 is a plan view of certain parts at the upper end of the casing. Fig. 4 is a combined sectional and plan view illustrating the local relation of certain parts at the lower end of the casing. Fig. 5 is a perspective view of a modified form of nozzle. Fig. 6 is a detail sectional view of one of the screens.

On the top of the fire-box or furnace A is placed an apertured cast-iron plate, $a$, to which vertical iron flues B are attached. The latter convey the products of combustion into a chimney-flue, as shown. These flues traverse an oblong roasting-chamber, whose walls D are formed of metal plates held together by cross-ties consisting of iron rods C and inclosed by a brick casing, E. On the said rods C are supported a series of coarse screens, F, Fig. 4, the same being formed of stout iron wire and arranged horizontally one above another. The connection between the screens F and rods C is by means of hooks $b$, Fig. 6, formed on the ends of the main wires composing the screens. This construction enables the screens to be readily attached and detached.

The green coffee-kernels are placed in the hopper G, having a side door in the casing E and a vertically-sliding gate, $e$. Upon raising the latter the coffee escapes into the cups of the endless-belt elevator H, which runs vertically on pulleys I I', outside the casing E. Said elevator delivers the coffee into an inclined spout, J, which conveys it through the casing E into a rotating cylinder, K, which is arranged at a slight horizontal inclination in the upper portion of the roasting-chamber D. The cylinder K is rotated by pulley-and-chain connection L with the shaft M, on which the upper elevator-pulley, I', is mounted. It is provided with suitable peripheral perforations to allow escape of the coffee-kernels. The latter fall successively upon and through the several wire screens F, which serve to retard their passage through the chamber, as well as to turn them and change their direction of motion more or less, so that upon reaching the inclined bottom N of the chamber they will have become well parched or roasted. They are then ready for delivery into any receptacle that may be provided, which is effected by allowing them to slide out of the chamber D into an inclined trough that forms practically a continuation of the plate N. To the outer end of this trough is attached an adjustable delivery spout or nozzle, O. Said nozzle consists of a short cylindrical tube, a portion of one side of which is cut away. When the nozzle is in the position shown in Figs. 1 and 4— that is to say, with its cut-away side uppermost—it will convey the parched coffee beyond the elevator H and deliver it into any receptacle that may be provided for the purpose; but when the nozzle is reversed in position or turned partly round the coffee will be discharged into the elevator H, and thus carried up and again delivered into the roasting-chamber. By means of this adjustable nozzle, therefore, the coffee may be caused to pass any required number of times through the roasting-chamber until completely parched.

In order to facilitate lateral discharge of the coffee into the elevator, I prefer to bend outward the inner side of the nozzle O, thus forming a lip, $c$, as shown in Fig. 5.

The roasting-chamber B may be utilized for baking articles of pastry, &c., by placing them on the iron top plate, $a$, of the fire-box and removal of one or more screens, if necessary.

What I claim is—

1. The heating chamber or oven for roasting green coffee, &c., the same being formed of a casing, a series of vertical flues traversing the same, and horizontal wire screens for retarding the velocity of the falling coffee-kernels, substantially as specified.

2. The combination, with horizontal rods traversing the roasting-chamber, of the wire screens, arranged horizontally and constructed with hooks for supporting them upon said rods, as shown and described.

3. The screens formed of wires secured side by side at a suitable distance apart, and having their ends bent to form hooks to adapt them for attachment to and detachment from supporting devices, as specified.

4. In combination with the elevator and discharge-spout of the roasting-chamber, the nozzle O, which is cut away on one side and attached to said spout, substantially as described, whereby it is adapted to be rotated or adjusted for discharging into the elevator or some other receptacle, as may be required.

WILLIAM WASHINGTON DUNN.

Witnesses:
J. J. KANE,
W. B. HOOFNAGLE.